(12) United States Patent
Webber

(10) Patent No.: US 9,915,371 B2
(45) Date of Patent: Mar. 13, 2018

(54) HYDRAULIC PORT SAFETY LOCKING DEVICE

(71) Applicant: Parker-Hannifin Corporation, Cleveland, OH (US)

(72) Inventor: Christopher John Webber, North Royalton, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 132 days.

(21) Appl. No.: 14/947,423

(22) Filed: Nov. 20, 2015

(65) Prior Publication Data

US 2016/0146231 A1  May 26, 2016

Related U.S. Application Data

(60) Provisional application No. 62/084,073, filed on Nov. 25, 2014.

(51) Int. Cl.
*F16K 1/42* (2006.01)
*F16K 31/122* (2006.01)
(Continued)

(52) U.S. Cl.
CPC ............ *F16K 31/122* (2013.01); *F15B 13/01* (2013.01); *F15B 20/00* (2013.01); *F16K 15/18* (2013.01); *F16K 17/0433* (2013.01); *F16K 31/1221* (2013.01); *F16K 31/1223* (2013.01); *F15B 2211/8623* (2013.01); *F15B 2211/8633* (2013.01); *F15B 2211/8636* (2013.01)

(58) Field of Classification Search
CPC ............ F16K 31/1221; F16K 31/1223; F16K 17/0433; F16K 15/18; F16K 31/122; F15B 20/00; F15B 2211/8623; F15B 2211/8633; F15B 2211/8636; F15B 13/01
USPC .................................. 137/540; 251/282, 28
See application file for complete search history.

(56) References Cited

U.S. PATENT DOCUMENTS 2,599,622 A * 6/1952 Folmsbee ........... F16K 17/0433
137/541
4,552,330 A * 11/1985 Grotloh ................... F01D 21/20
251/25

(Continued)

OTHER PUBLICATIONS

Parker-Hannifin Corporation; Catalog HY14-30000/US; Exectrol Directional Control Valves Series 961, 962, 963, 965; pp. B14-B16; 2006.

(Continued)

*Primary Examiner* — Umashankar Venkatesan
(74) *Attorney, Agent, or Firm* — Renner, Otto, Boisselle & Sklar, LLP

(57) ABSTRACT

Provided is a hydraulic valve including a valve body having a first port, a second port, and a pilot port, and a piston movable in the valve body to an open position by a pilot pressure flowing through the pilot port that acts on a portion of the piston to move the piston away from a valve seat in the body to allow fluid flow between the first and second ports. The piston is then movable to the closed position by a resilient member in the absence of the pilot pressure. In this way, during an event such as a power failure of a vehicle when the pilot pressure is unavailable, the valve is closed to prevent fluid draining from a hydraulic function to prevent movement of the function without using a mechanical locking device.

25 Claims, 8 Drawing Sheets

(51) Int. Cl.
- *F15B 13/01* (2006.01)
- *F15B 20/00* (2006.01)
- *F16K 15/18* (2006.01)
- *F16K 17/04* (2006.01)

(56) References Cited

U.S. PATENT DOCUMENTS

| | | | | |
|---|---|---|---|---|
| 5,525,266 A | * | 6/1996 | Thompson | F02M 29/04 239/498 |
| 6,929,238 B2 | * | 8/2005 | Bartell, Jr. | F16K 15/063 251/129.03 |

OTHER PUBLICATIONS

Parker-Hannifin Corporation; Catalong HY14-3200/US; Slip-in Cartridge Valves Series C18D*C; pp. 136-139; 2012.

\* cited by examiner

HYDRAULIC PORT SAFETY LOCKING DEVICE

This application claims the benefit of U.S. Provisional Application No. 62/084,073 filed Nov. 25, 2014.

FIELD OF INVENTION

The present invention relates generally to valves, and more particularly to pilot operated hydraulic valves for mobile equipment.

BACKGROUND

Hydraulic systems, such as those found in work machines, employ a hydraulic cylinder to raise and lower relatively heavy loads and at times to support such loads in an elevated position. A hydraulic valve may be provided in the hydraulic system on the work machine to prevent movement of the cylinder to support the load in the elevated position in the event of a loss of the hydraulic system, such as by trapping hydraulic fluid in the cylinder to prevent the cylinder from retracting. The valves may be used in combination with a locking device to prevent movement of the function. A pilot pressure is applied to open a poppet of the valve to allow fluid flow through the valve. Removal of the pilot pressure will allow the valve to close, preventing fluid flow through the valve.

SUMMARY OF INVENTION

The present invention provides a hydraulic valve including a valve body having a first port, a second port, and a pilot port, and a piston movable in the valve body to an open position by a pilot pressure flowing through the pilot port, which acts on a portion of the piston to move the piston away from a valve seat in the body to allow fluid flow between the first and second ports. The piston is then movable to the closed position by a resilient member in the absence of the pilot pressure. In this way, during an event such as a power failure of a vehicle when the pilot pressure is unavailable, the valve is closed to prevent fluid draining from a hydraulic function to prevent movement of the function without the use of a mechanical locking device.

According to one aspect of the invention, a valve is provided that includes a body having an axis, an axially extending cavity, and at least one first port and at least one second port opening to the cavity, a compliant valve seat mounted in the body, and a piston disposed in the body and having a front side and a back side, the front side having an axially facing sealing land defined between a radially outer edge of the front side and a radially outer edge of an annular groove spaced radially inward from the outer edge, wherein an axially facing sealing face of the compliant valve seat does not extend beyond a radially inner edge of the groove in a direction perpendicular to the axis.

The piston may be biased in a closed position where the sealing land engages the axially facing sealing face of the compliant seat to prevent fluid flow between the first and second ports, and the piston is movable to an open position away from the valve seat to allow fluid flow between the ports.

The compliant valve seat may be resilient.

The body may include first and second ends, the axially extending cavity extending therebetween, the first port extending through the first end to the cavity, the second port extending through a side wall of the body to the cavity, and a pilot port extending through the side wall of the body to the cavity.

The piston may include a piston body having a radially outwardly extending projection, whereby the piston is movable to an open position by fluid flowing through the pilot port that acts on the radially outwardly extending projection to move the sealing land away from the valve seat to allow fluid flow between the ports.

The valve may further include a resilient member, wherein the piston is biased in the closed position by the resilient member, whereby the piston is movable to the closed position by the resilient member in the absence of the pilot pressure.

The piston may have a bore extending through the piston from the front side to the back side, and wherein a pressure balancing area is defined in the axially extending cavity between the back side of the piston and a second end of the body.

When the piston is in the closed position, fluid from the first port flows through the bore into the pressure balancing area to prevent the piston from being unseated by fluid pressure from the first port.

The body may further include a tank port extending through the side wall of the body to the cavity, wherein the tank port connects an area of the cavity between the radially outwardly extending projection of the piston and the second end of the body to vent the area, the area being isolated from the pressure balancing area.

The valve may further include a cap secured to the second end of the body.

The piston body may include a groove for receiving a seal for sealing the piston body to a first part of the body in the cavity and the radially outwardly extending projection includes a groove for receiving a seal for sealing the projection to a second part of the body in the cavity.

The at least one second port may include a plurality of circumferentially spaced ports.

The front side of the piston may have a central nose portion and an ogee between the nose portion and the radially outer edge of the front side to guide the fluid flow to/from the first port from/to the second port.

According to another aspect of the invention, a valve is provided that includes a body having first and second ends, an axially extending cavity extending therebetween, a first port extending through the first end to the cavity, a second port extending through a side wall of the body to the cavity, and a pilot port extending through the side wall of the body to the cavity, a valve seat mounted with respect to the body, a resilient member disposed in the body, and a piston disposed in the body and biased by the resilient member in a closed position against the valve seat to prevent fluid flow between the first and second ports, the piston including a body having a radially outwardly extending projection and a sealing land that seats against the valve seat, whereby the piston is movable to an open position by a pilot pressure communicated through the pilot port that acts on the radially outwardly extending projection to move the sealing land away from the valve seat to allow fluid flow between the first and second ports, and whereby the piston is movable to the closed position by the resilient member in the absence of the pilot pressure.

The sealing land may be provided on a front side of the piston and defined between a radially outer edge of the front side and a radially outer edge of an annular groove spaced radially inward from the outer edge.

An axially facing sealing face of the valve seat does not extend beyond a radially inner edge of the groove in a direction perpendicular to an axis of the body.

The valve seat may be resilient.

The piston may have a bore extending through the piston from a front side to a back side of the piston, and wherein a pressure balancing area is defined in the axially extending cavity between the back side of the piston and the second end of the body.

When the piston is in the closed position, fluid from the first port flows through the bore into the pressure balancing area to prevent the piston from being unseated by fluid pressure from the first port.

The body may further include a tank port extending through the side wall of the body to the cavity, wherein the tank port connects an area of the cavity between the radially outwardly extending projection of the piston and the second end of the body to vent the area, the area being isolated from the pressure balancing area.

The at least one second port may include a plurality of circumferentially spaced ports.

The front side of the piston may have a central nose portion and an ogee between the nose portion and the radially outer edge of the front side to guide the fluid flow to/from the first port from/to the second port.

According to still another aspect of the invention, a valve is provided that includes a body having first and second ends, an axially extending cavity extending therebetween, a first port extending through the first end to the cavity, and a second port extending through a side wall of the body to the cavity, a compliant valve seat mounted in the body, and a piston disposed in the body and having a front side, a back side, and a bore extending through the piston from the front side to the back side, the front side having an axially facing sealing land defined between a radially outer edge of the front side and a radially outer edge of an annular groove spaced radially inward from the outer edge and radially outward from the bore, whereby sealing forces acting on the valve are concentrated on the axially facing sealing land.

An axially facing sealing face of the compliant valve seat does not extend beyond a radially inner edge of the groove in a direction perpendicular an axis of the body.

The piston may be biased in a closed position where the sealing land engages the axially facing sealing face of the compliant seat to prevent fluid flow between the first and second ports, and the piston is movable to an open position away from the valve seat to allow fluid flow between the ports.

The front side of the piston may have a central nose portion and an ogee between the nose portion and the radially outer edge of the front side to guide the fluid flow to/from the first port from/to the second port.

The foregoing and other features of the invention are hereinafter described in greater detail with reference to the accompanying drawings.

DETAILED DESCRIPTION

The principles of this present invention have particular application to hydraulic valve assemblies having pilot operated valves that provide bidirectional hydraulic circuit interruption in a work machine, such as a skid-steer loader, such as during power failure or when the power is turned off, when a parking brake is set, or when the operator is out of the seat, and thus will be described below chiefly in this context. It will of course be appreciated, and also understood, that principles of this invention may be applicable to other work machines, such as excavators, loading shovels, backhoe shovels, mining equipment, industrial machinery and the like, having one or more actuated components such as lifting and/or tilting arms, booms, buckets, steering and turning functions, traveling means, etc.

Figure 1:
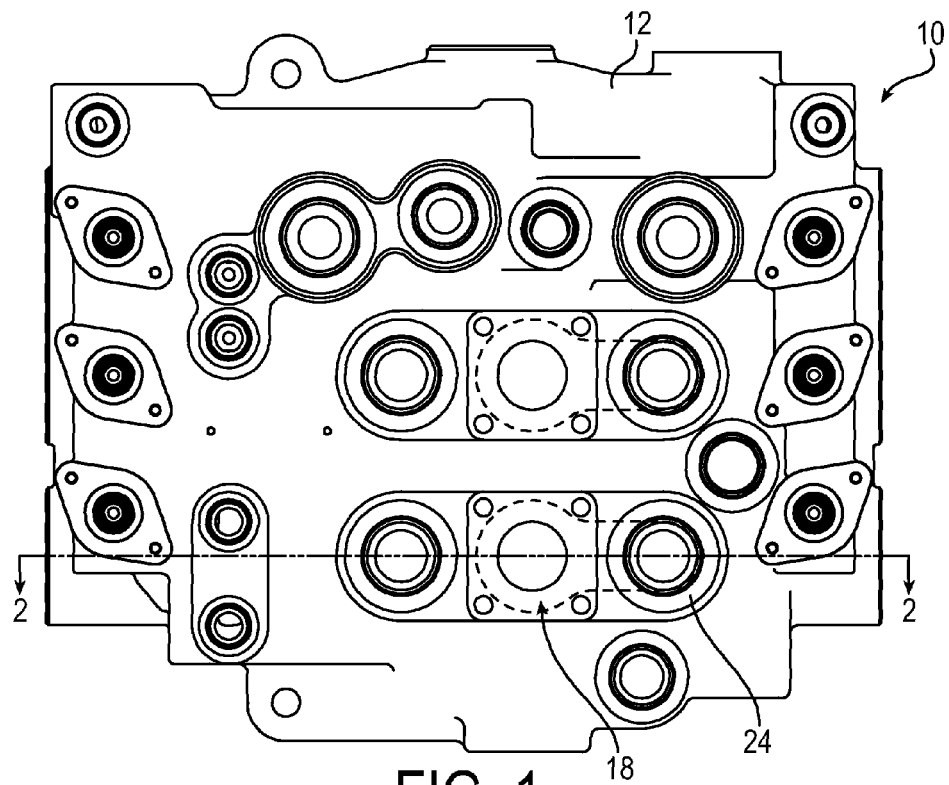
FIG. 1 is a top view of an exemplary valve assembly.
Figure 2:
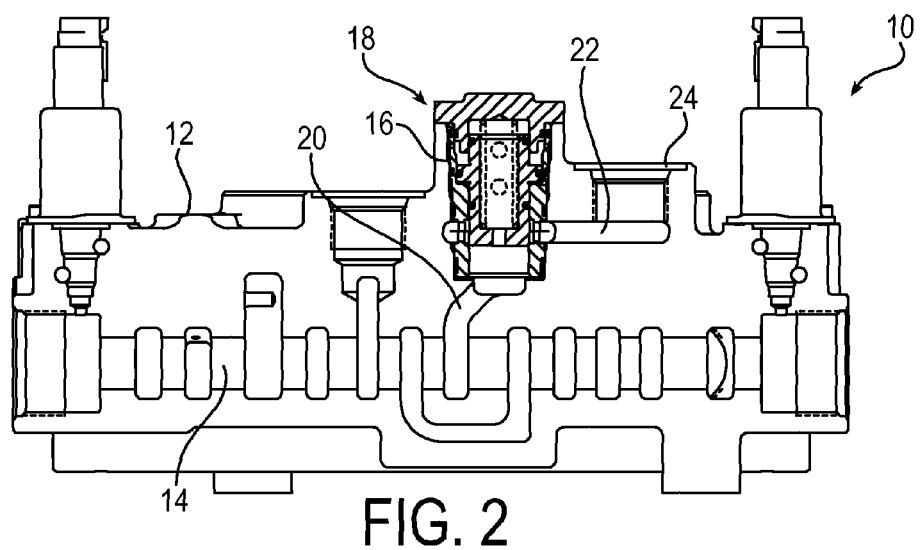
FIG. 2 is a cross-sectional view of the valve assembly taken about line 2-2 in FIG. 1 illustrating an exemplary safety valve according to the invention.

Referring to the drawings, and initially to FIGS. 1 and 2, an exemplary valve assembly is illustrated generally at reference numeral 10. The valve assembly 10 is configured to be installed on a work machine, such as a skid-steer loader, to control hydraulic fluid flow to/from actuated components. The valve assembly 10 includes a housing 12 formed in any suitable manner, such as a monocast valve housing, which incorporates an inlet port, a tank port, a pair of work ports, and one or more control spools received in respective bores 14. The housing 12 also includes one or more valve ports 16 for receiving respective safety or flow blocking valves 18, which will be discussed in detail below. As shown, the housing includes two valve ports for receiving a respective safety valve 18. The safety valves 18 allow fluid flow from/to a respective first passage 20 communicating with the respective spool to/from a respective second passage 22 communicating with a respective port 24 that couples to an actuated component, such as an actuator, and prevent fluid flow between the passages 20 and 22.

Figure 6:
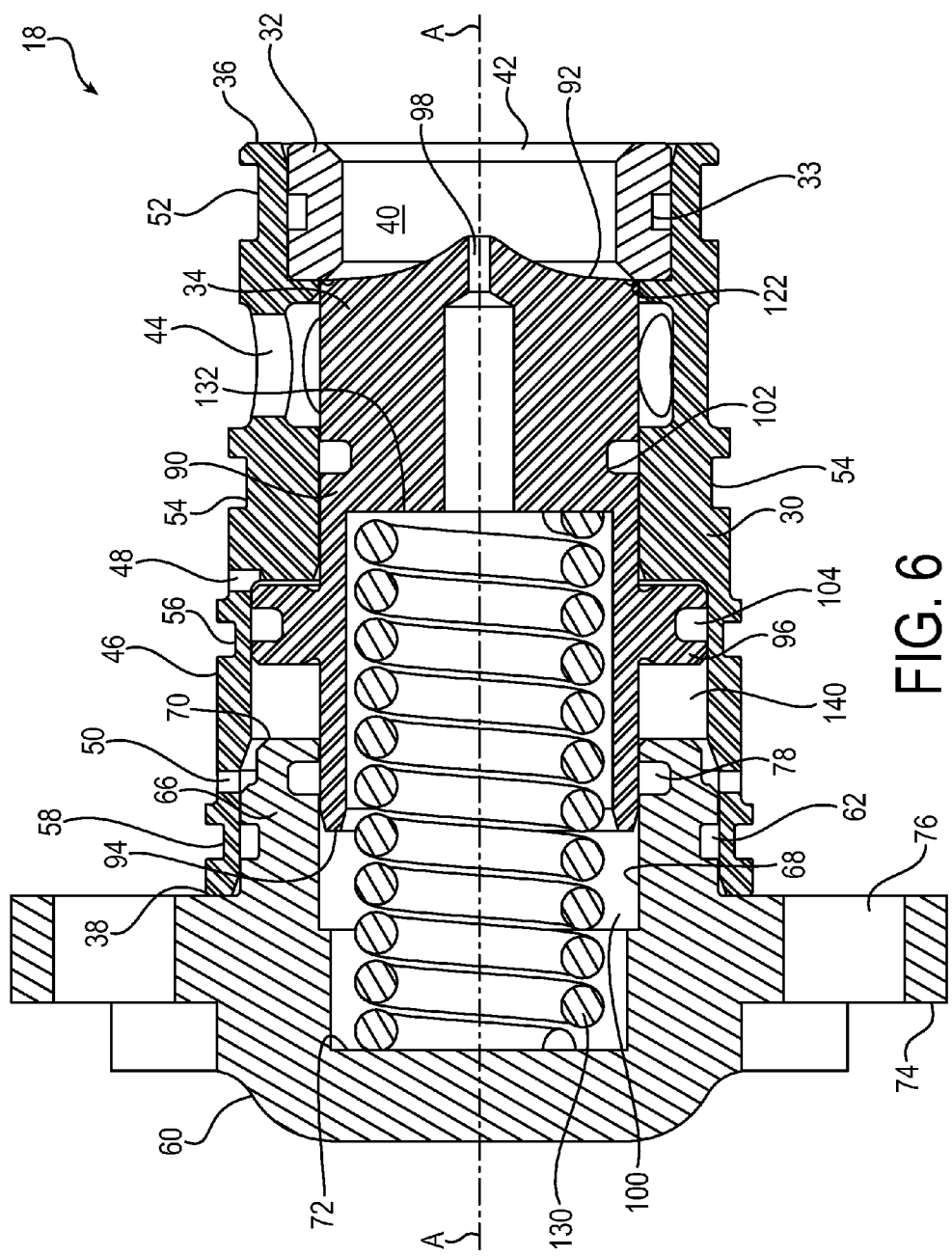
FIG. 6 is a cross-sectional view of the safety valve in a closed position taken about line 6-6 in FIG. 5.

Turning now to FIGS. 3-11, and initially to FIG. 6, the safety valve 18 may be a bi-directional pressure balanced pilot operated valve that provides low leakage and that changes state through the application or removal of a low pressure pilot signal. The safety valve 18 includes a valve body 30, a valve seat, such as a resilient compliant valve seat 32 mounted in or adjacent to the valve body 30 and sealed to the valve body by a suitable seal, such as an o-ring received in seal groove 33, and a piston 34 disposed in the valve body 30. The valve body 30 has an axis A-A along its length, first and second ends 36 and 38, an axially extending cavity 40 extending between the first and second ends 36 and 38, and a plurality of ports.

Figure 3:
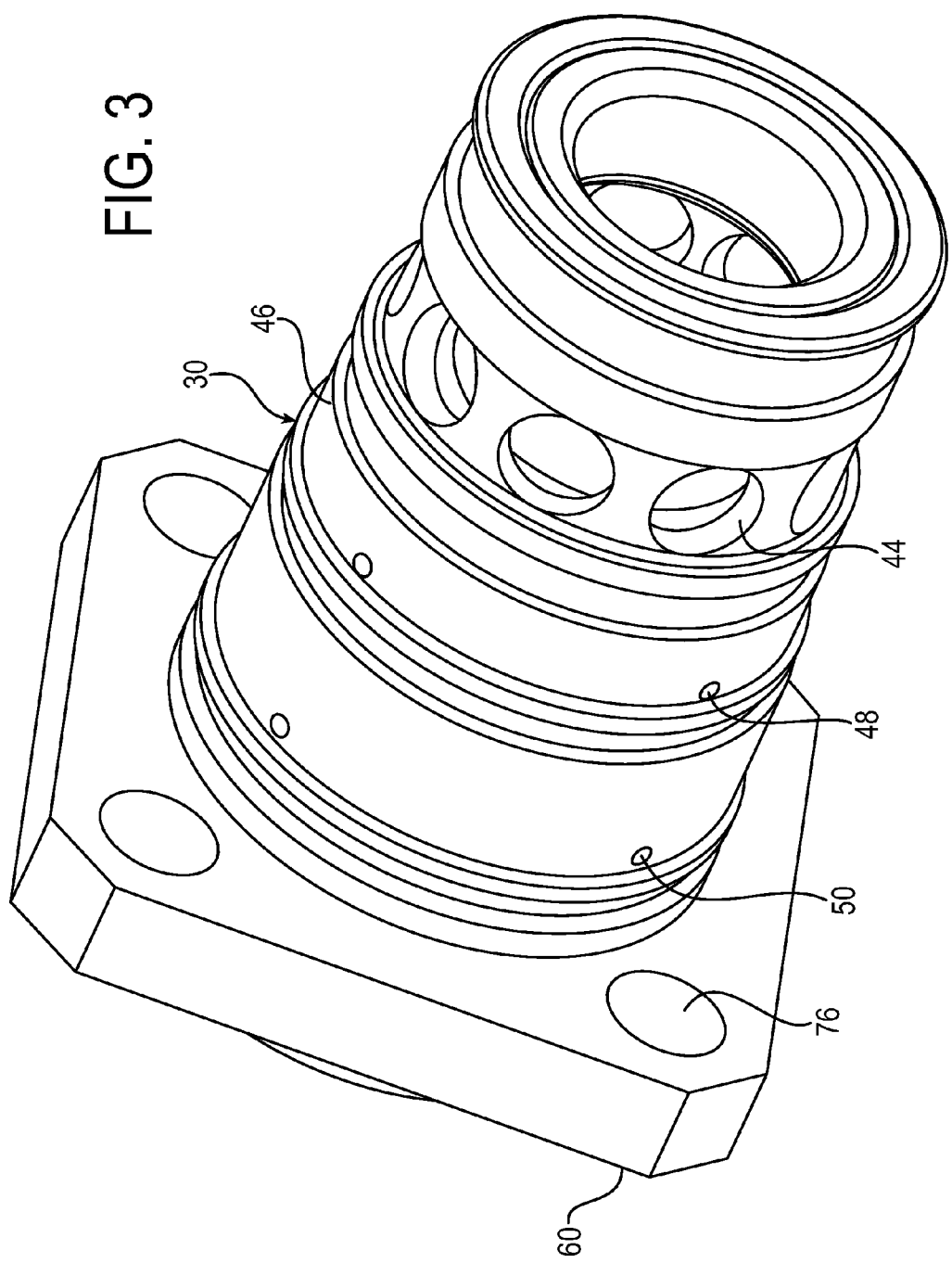
FIG. 3 is a perspective view of a valve body and valve seat of an exemplary safety valve according to the invention.
Figure 4:
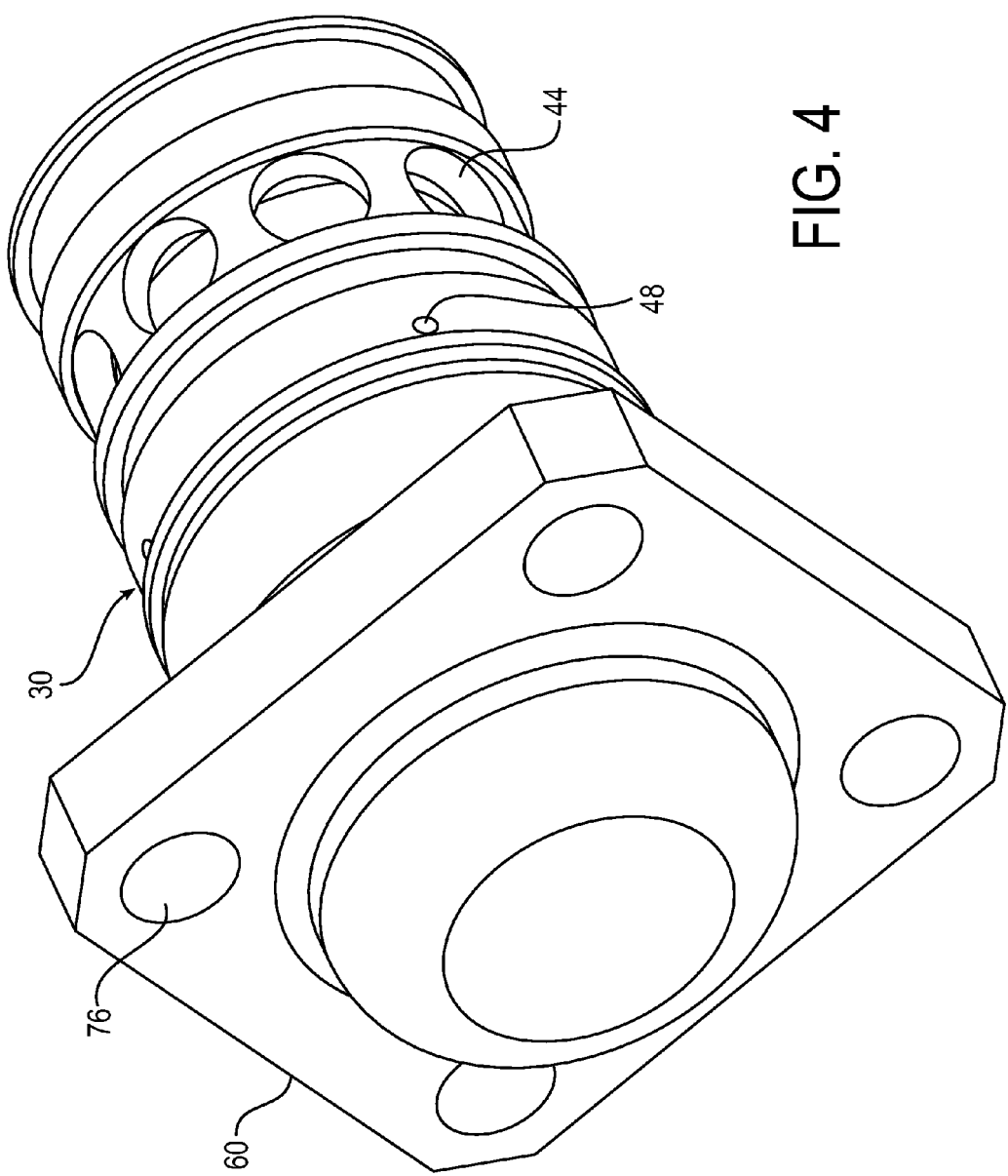
FIG. 4 is another perspective view of the valve body and valve seat of the exemplary safety valve according to the invention.
Figure 5:
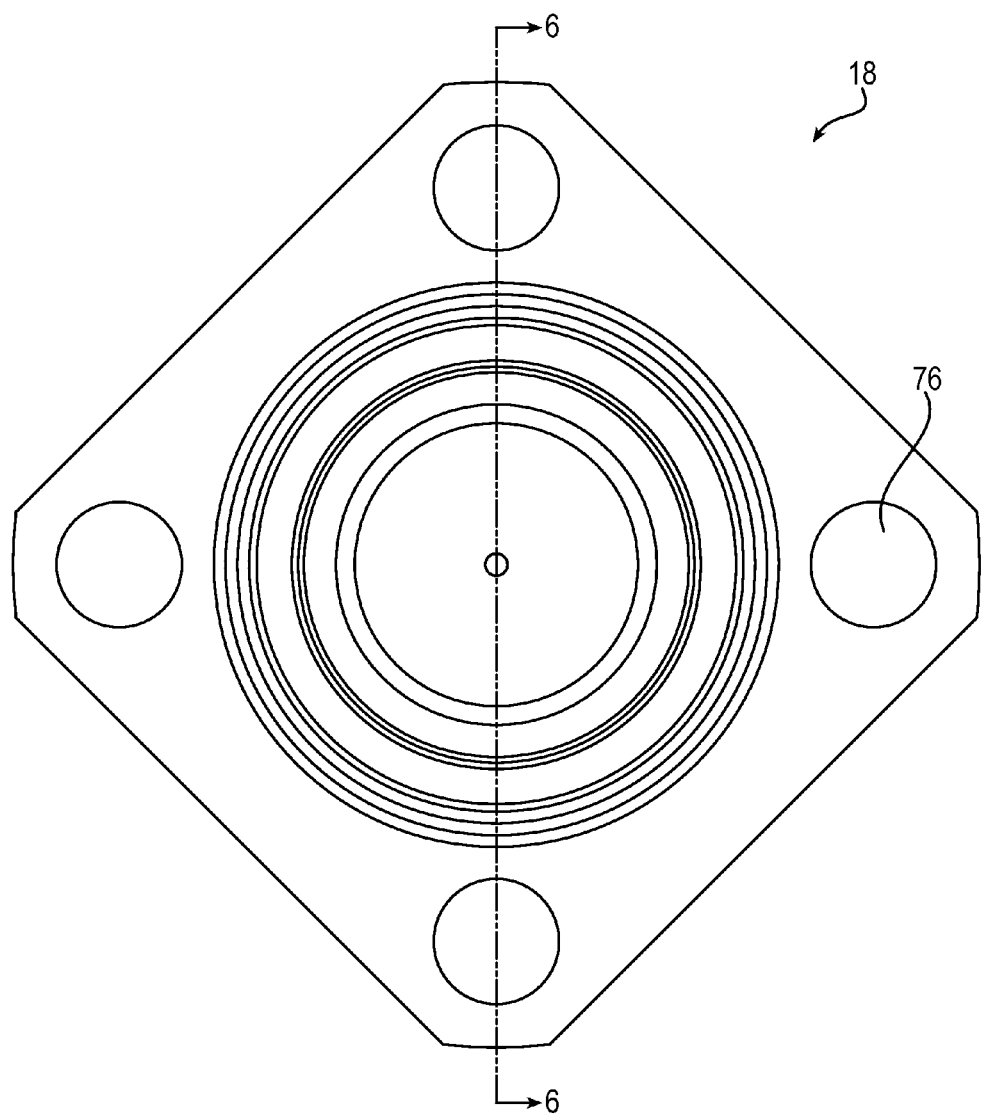
FIG. 5 is an end view of the safety valve.

For example, the valve body 30 may include at least one first port 42 extending through the first end 36 to the cavity 40, at least one second port 44 extending through a side wall 46 of the valve body 30 to the cavity 40, at least one pilot port 48 extending through the side wall 46 to the cavity 40, and at least one tank port 50 extending through the side wall 46 to the cavity 40. As shown in FIGS. 3 and 4, the valve body 30 includes a plurality of circumferentially spaced second ports 44, a plurality of circumferentially spaced pilot ports 48, and a plurality of circumferentially spaced tank ports 50. The valve body 30 may also include one or more grooves, and as shown four radially outwardly opening grooves 52, 54, 56 and 58 on an outer surface of the valve body 30. The radially outwardly opening grooves 52, 54, 56, and 58 are each configured to receive a suitable seal, such as an o-ring for sealing the valve body to the housing 12 to prevent leakage from the first port 42, second port 44, pilot port 48, and tank port 50.

The safety valve 18 also includes a cap 60 secured to the second end 38 of the valve body 30. The cap 60 is secured to the valve body 30 in any suitable manner, and may be sealed to the valve body 30 by a suitable seal, such as an o-ring received in a radially outwardly opening seal groove 62 to prevent leakage of fluid from area 140. The cap 60 includes a body 66 having a bore 68 extending from an end 70 of the body 66 to an inner end 72 of the body 66 that serves as a spring seat, and a flange portion 74 having a plurality of openings 76 for receiving suitable fasteners to couple the safety valve 18 to the housing 12. The piston 34 is movable within the bore 68, and the cap 60 is sealed to the piston 34 by a suitable seal, such as a double-acting o-ring received in a radially inwardly opening seal groove 78 in the bore 68.

Figure 10:
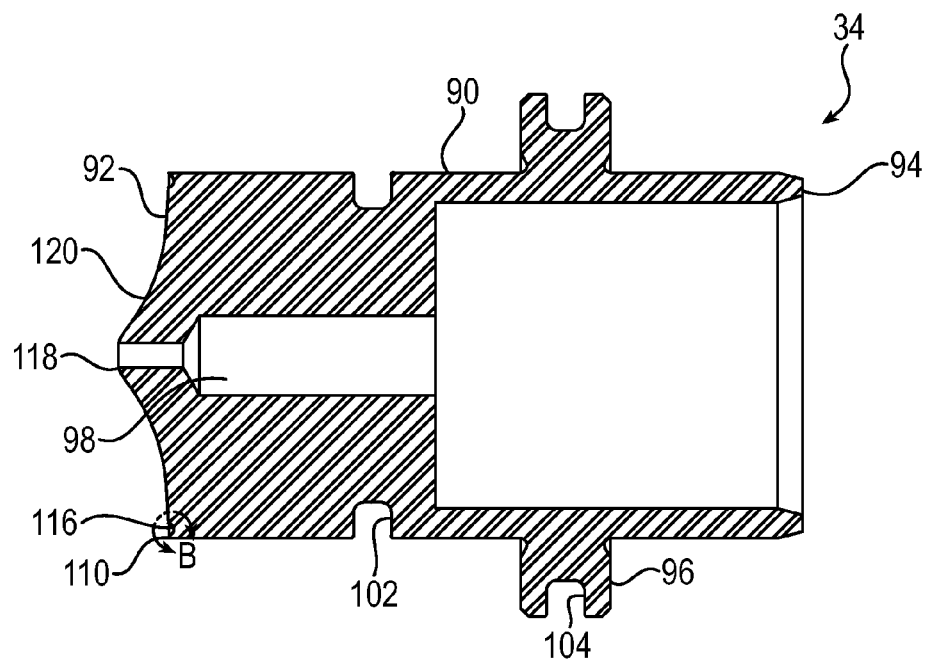
FIG. 10 is a cross-sectional view of the piston taken about line 10-10 in FIG. 9.
Figure 11:
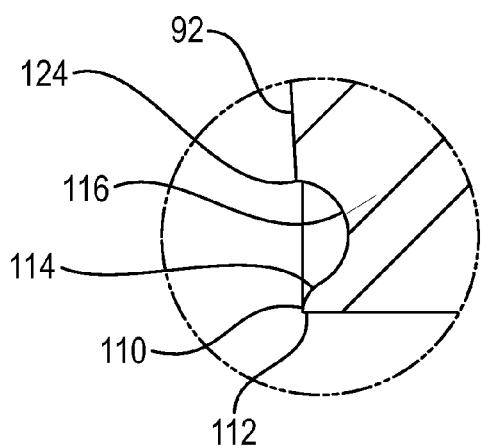
FIG. 11 is an enlarged view of detail B in FIG. 10.

Referring now to FIGS. 10 and 11 in addition to FIG. 6, the piston 34 includes a piston body 90 having a first or front side 92 and a second or back side 94, a projection 96 extending radially outwardly from the body 90, and a bore 98 extending through the piston from the front side 92 to the back side 94. A pressure balancing area 100 (FIG. 6) is defined in the axially extending cavity 40 of the valve body 30 between the back side 94 and the inner end 72 of cap 60. The piston 90 may be sealed to the valve body 30 in any suitable manner, such as by suitable seals, such as double-acting o-rings provided in radially outwardly opening grooves 102 and 104 to seal the piston body 90 and the radially outwardly extending projection 96 to the valve body 30 in the cavity 40. The seal in the groove 104 prevents fluid leakage between the pilot port 48 and the tank port 50, and the seal in the groove 102 prevents leakage between the second ports 44 and the pilot port 48.

The front side 92 of the piston body 90 has an axially facing sealing land 110 defined between a radially outer edge 112 of the front side 92 and a radially outer edge 114 of an annular groove 116 spaced radially inward from the outer edge 114. The front side 92 also has central nose portion 118 which may contain and an ogee 120 between the nose portion 118 and the radially outer edge 112 to guide the fluid flow to/from the first port 42 from/to the second port 44. An axially facing sealing face 122 of the compliant valve seat 32 does not extend beyond a radially inner edge 124 of the annular groove 116 in a direction perpendicular to the axis A-A, which allows the valve to be pressure balanced while using a relatively low pilot pressure and closing force.

The piston 34 is biased by a resilient member 130 in a closed position shown in FIG. 6 where the sealing land 110 engages the axially facing sealing face 122 of the compliant valve seat 32 to prevent fluid flow between the first port 42 and the plurality of circumferentially spaced second ports 44. The resilient member 130 has a first end that is seated on the inner end 72 of the cap and a second end that is seated on an inner end 132 of the piston 34. The bore 98 extends through the piston body 90 from the back side 94 to the inner end 132, and continues through the inner end at a reduced diameter to the front side 92.

Figure 7:
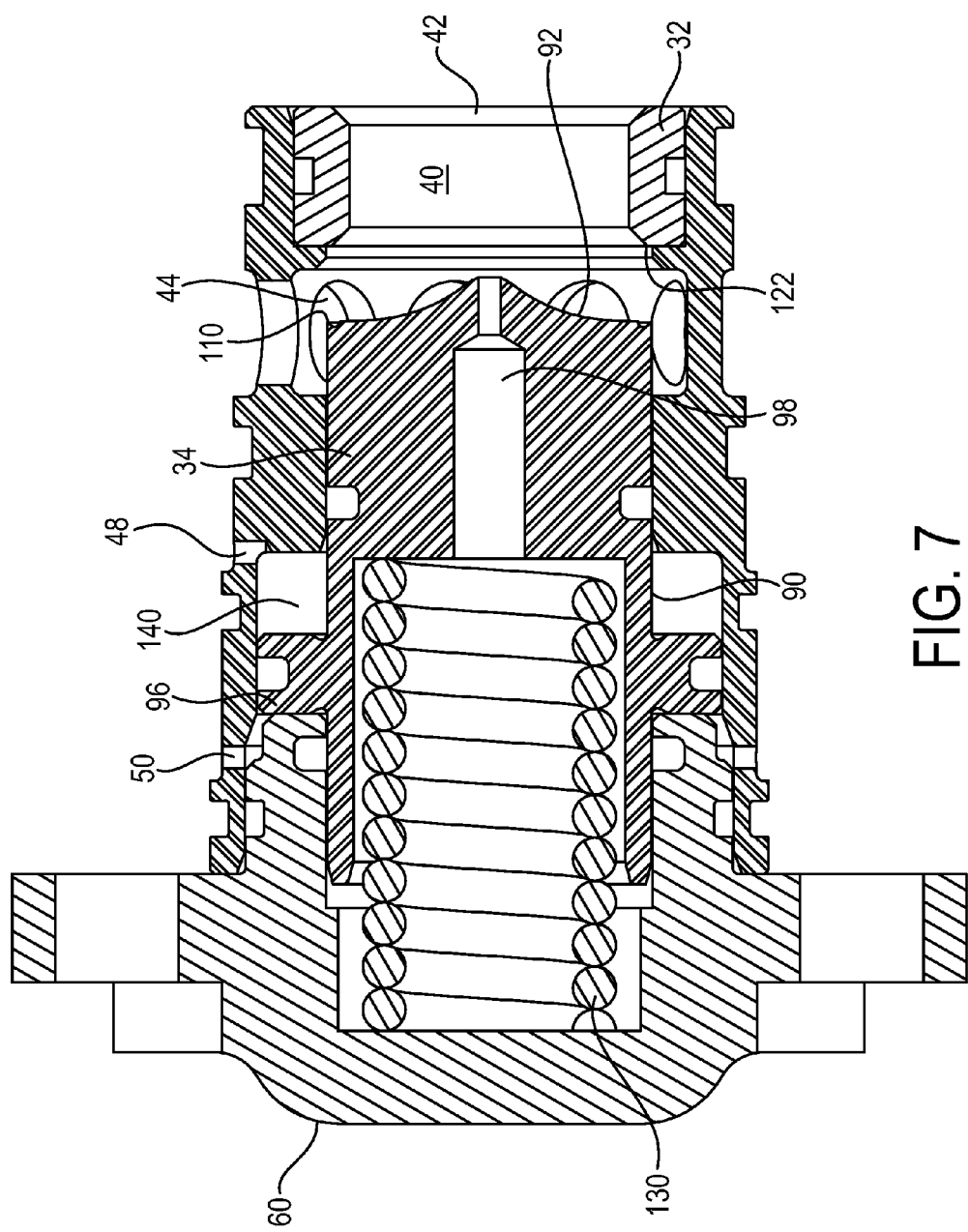
FIG. 7 is a cross-sectional view of the safety valve in an open position.
Figure 8:
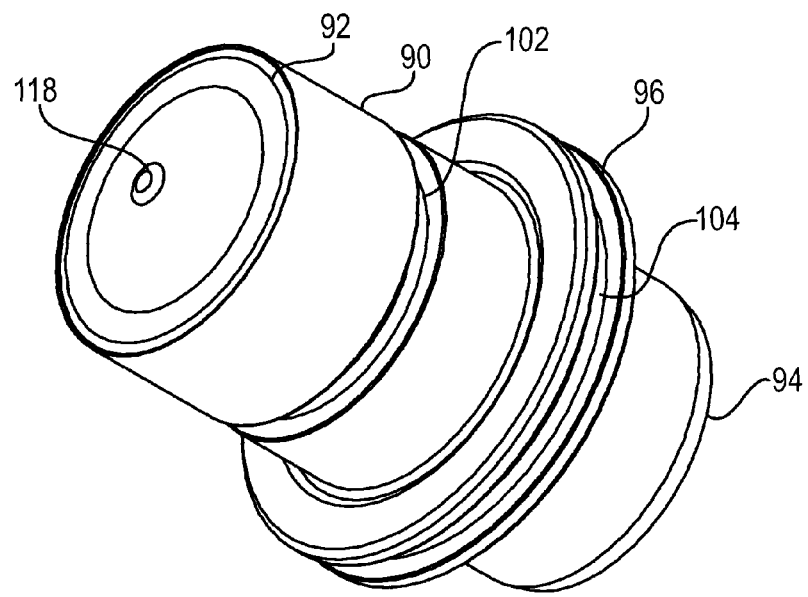
FIG. 8 is a perspective view of an exemplary piston of the safety valve.
Figure 9:
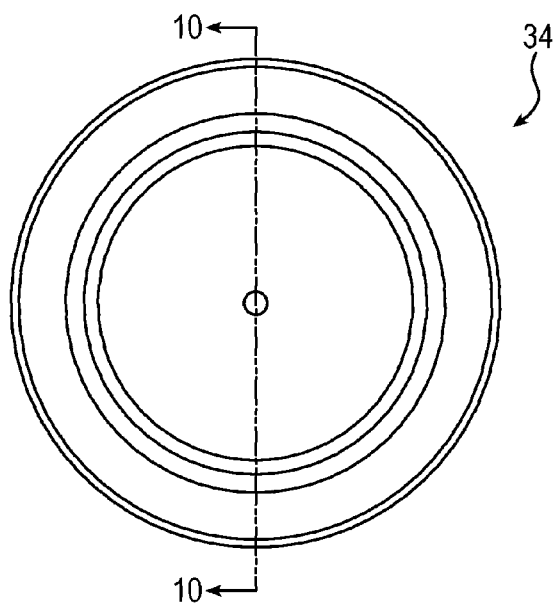
FIG. 9 is an end view of the piston.

The piston 34 is movable to an open position shown in FIG. 7 away from the compliant valve seat 32 to allow full fluid flow between the first port 42 and the plurality of circumferentially spaced second ports 44 in either direction. The piston is movable to the open position by fluid flowing through the at least one pilot port 48 that acts on the radially outwardly extending projection 96 to move the sealing land 110 away from the axially facing sealing face 122 to allow fluid flow between the first and second ports 42 and 44.

The piston 34 is movable to the closed position by the resilient member 130 in the absence of the pilot pressure, for example during a predetermined event, such as a power failure or when the power is turned off, when a parking brake is set by an operator, or when the operator is out of the seat of the vehicle, for example to render a load immobile. When the piston 34 is in the closed position, fluid from the first port 42 may flow through the bore 98 into the pressure balancing area 100 to prevent the piston 34 from being unseated by fluid pressure from the first port 42, and fluid from the second ports 44 flows against the piston body 90 in a direction perpendicular to the axis A-A and thus cannot unseat the piston 34. Thus, the safety valve 18 seals irrespective of the pressure in either the first or second ports 42 and 44.

During operation of the skid-steer loader, for example when a bucket of the loader is being raised, hydraulic fluid flows from the passage 20 towards the passage 22. The pilot pressure flows into the plurality of pilot ports 48 and act on the radially outwardly extending projection 96 to compress the resilient member 130 and move the sealing land 110 away from the axially facing sealing face 122 as shown in FIG. 7. The fluid thereby flows from the passage 20 into the first port 42 and through the axially extending cavity 40, where the fluid will be guided towards the plurality of second ports 44 by the front side 92 of the piston 34. The fluid then flows out of the second ports 44 and into the passage 22 to a cylinder. As the piston 34 is being moved, the volume of fluid in an area 140 of the axially extending cavity 40 between the radially outwardly extending projection 96 of the piston 34 and the end 70 of the cap 60 varies. The fluid flows out of the plurality of tank ports 50 to vent the area 140, which is isolated from the pressure balancing area 100. Fluid may build up in the area 140, for example hydraulic fluid leaking past the o-ring in the groove 104 or air entering the area 140.

During the predetermined event, such as during power failure of the skid-steer loader, the pilot pressure will no longer be provided, and due to the valve 18 being pressure balanced, there will be no pressure opposing the force resilient member 130. The resilient member 130 will move the piston 34 to the closed position shown in FIG. 6, where the sealing land 110 is seated on and deforms the sealing face 122 to close the valve 18. In this way, the bucket will be held up to prevent the bucket from rapidly falling and causing damage or injury, without using a mechanical locking device on a main control valve spool to prevent movement of an actuator. Once power is restored, the pilot pressure can be directed to flow through the pilot ports 48 to open the valve 18 to allow, for example, fluid flow from passage 22 through the second ports 44 to the first port 42 to lower the bucket. The safety valve 18 operates without a dedicated external control circuit or a spool with small diametric clearances and a long engagement length.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve including:
a body having an axis, an axially extending cavity, and at least one first port and at least one second port opening to the cavity;
a compliant valve seat mounted in the body; and
a piston disposed in the body movable toward and away from the valve seat and having a front side and a back side, the front side having an axially facing sealing land defined between a radially outer edge of the front side and a radially outer edge of an annular groove spaced radially inward from the radially outer edge of the front side,
wherein an axially facing sealing face of the compliant valve seat does not extend beyond a radially inner edge of the groove in a direction perpendicular to the axis.

2. The valve according to claim 1, wherein the piston is biased in a closed position where the sealing land engages the axially facing sealing face of the compliant seat to prevent fluid flow between the first and second ports, and the piston is movable to an open position away from the valve seat to allow fluid flow between the ports.

3. The valve according to claim 1, wherein the compliant valve seat is resilient.

4. The valve according to claim 1, wherein the body includes first and second ends, the axially extending cavity extending therebetween, the first port extending through the first end to the cavity, the second port extending through a side wall of the body to the cavity, and a pilot port extending through the side wall of the body to the cavity.

5. The valve according to claim 4, wherein the piston includes a piston body having a radially outwardly extending projection, whereby the piston is movable to an open position by fluid flowing through the pilot port that acts on the radially outwardly extending projection to move the sealing land away from the valve seat to allow fluid flow between the ports.

6. The valve according to claim 5, further including a resilient member, wherein the piston is biased in the closed position by the resilient member, whereby the piston is movable to the closed position by the resilient member in the absence of the pilot pressure.

7. The valve according to claim 1, wherein the piston has a bore extending through the piston from the front side to the back side, and wherein a pressure balancing area is defined in the axially extending cavity between the back side of the piston and a second end of the body.

8. The valve according to claim 7, whereby when the piston is in the closed position, fluid from the first port flows through the bore into the pressure balancing area to prevent the piston from being unseated by fluid pressure from the first port.

9. The valve according to claim 5, wherein the body further includes a tank port extending through the side wall of the body to the cavity, wherein the tank port connects an area of the cavity between the radially outwardly extending projection of the piston and the second end of the body to vent the area, the area being isolated from the pressure balancing area.

10. The valve according to claim 4, further including a cap secured to the second end of the body.

11. The valve according to claim 5, wherein the piston body includes a groove for receiving a seal for sealing the piston body to a first part of the body in the cavity and the radially outwardly extending projection includes a groove for receiving a seal for sealing the projection to a second part of the body in the cavity.

12. The valve according to claim 1, wherein the at least one second port includes a plurality of circumferentially spaced ports.

13. The valve according to claim 1, wherein the front side of the piston has a central nose portion and an ogee between the nose portion and the radially outer edge of the front side to guide the fluid flow to/from the first port from/to the second port.

14. A valve including: a body having first and second ends, an axially extending cavity extending therebetween, a first port extending through the first end to the cavity, a second port extending through a side wall of the body to the cavity, and a pilot port extending through the side wall of the body to the cavity; a valve seat mounted with respect to the body; a resilient member disposed in or adjacent to the body; and a piston disposed in the body and biased by the resilient member in a closed position against the valve seat to prevent fluid flow between the first and second ports, the piston including a body having a radially outwardly extending projection and a sealing land that seats against the valve seat, whereby the piston is movable to an open position by a pilot pressure communicated through the pilot port that acts on the radially outwardly extending projection to move the sealing land away from the valve seat to allow fluid flow between the first and second ports, and whereby the piston is movable to the closed position by the resilient member in the absence of the pilot pressure wherein the sealing land is provided on a front side of the piston and defined between a radially outer edge of the front side and a radially outer edge of an annular groove spaced radially inward from the outer edge.

15. The valve according to claim 14, wherein an axially facing sealing face of the valve seat does not extend beyond a radially inner edge of the groove in a direction perpendicular to an axis of the body.

16. The valve according to claim 1, wherein the valve seat is resilient.

17. The valve according to claim 1, wherein the piston has a bore extending through the piston from a front side to a back side of the piston, and wherein a pressure balancing area is defined in the axially extending cavity between the back side of the piston and the second end of the body.

18. The valve according to claim 17, whereby when the piston is in the closed position, fluid from the first port flows through the bore into the pressure balancing area to prevent the piston from being unseated by fluid pressure from the first port.

19. The valve according to claim 1, wherein the body further includes a tank port extending through the side wall of the body to the cavity, wherein the tank port connects an area of the cavity between the radially outwardly extending projection of the piston and the second end of the body to vent the area, the area being isolated from the pressure balancing area.

20. The valve according to claim 1, wherein the at least one second port includes a plurality of circumferentially spaced ports.

21. The valve according to claim 14, wherein the front side of the piston has a central nose portion and an ogee between the nose portion and the radially outer edge of the front side to guide the fluid flow to/from the first port from/to the second port.

22. A valve including:
a body having first and second ends, an axially extending cavity extending therebetween, a first port extending through the first end to the cavity, and a second port extending through a side wall of the body to the cavity;
a compliant valve seat mounted in the body; and
a piston disposed in the body movable toward and away from the valve seat and having a front side, a back side, and a bore extending through the piston from the front side to the back side, the front side having an axially facing sealing land defined between a radially outer edge of the front side and a radially outer edge of an annular groove spaced radially inward from the radially outer edge of the front side and radially outward from the bore,
whereby sealing forces acting on the valve are concentrated on the axially facing sealing land.

23. The valve according to claim 22, wherein an axially facing sealing face of the compliant valve seat does not extend beyond a radially inner edge of the groove in a direction perpendicular an axis of the body.

24. The valve according to claim 22, wherein the piston is biased in a closed position where the sealing land engages the axially facing sealing face of the compliant seat to prevent fluid flow between the first and second ports, and the piston is movable to an open position away from the valve seat to allow fluid flow between the ports.

25. The valve according to claim 22, wherein the front side of the piston has a central nose portion and an ogee between the nose portion and the radially outer edge of the front side to guide the fluid flow to/from the first port from/to the second port.

* * * * *